United States Patent
Lin et al.

(10) Patent No.: US 10,666,971 B2
(45) Date of Patent: May 26, 2020

(54) METHOD AND DEVICE FOR IMAGE CODING AND METHOD AND DEVICE FOR IMAGE DECODING

(71) Applicants: TONGJI UNIVERSITY, Shanghai (CN); ZTE Corporation, Shenzhen (CN)

(72) Inventors: Tao Lin, Shanghai (CN); Ming Li, Shenzhen (CN); Guoqiang Shang, Shenzhen (CN); Zhao Wu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 8 days.

(21) Appl. No.: 15/551,945

(22) PCT Filed: Jan. 25, 2016

(86) PCT No.: PCT/CN2016/072039
§ 371 (c)(1),
(2) Date: Aug. 18, 2017

(87) PCT Pub. No.: WO2016/119666
PCT Pub. Date: Aug. 4, 2016

(65) Prior Publication Data
US 2018/0035132 A1 Feb. 1, 2018

(30) Foreign Application Priority Data
Jan. 26, 2015 (CN) .......................... 2015 1 0037769
Jan. 22, 2016 (CN) .......................... 2016 1 0045722

(51) Int. Cl.
*H04N 7/12* (2006.01)
*H04N 11/02* (2006.01)
(Continued)

(52) U.S. Cl.
CPC .......... *H04N 19/59* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS

| 10,237,575 | B2* | 3/2019 | Tsai | ........................ | H04N 19/94 |
| 2013/0039423 | A1* | 2/2013 | Helle | .................... | H04N 19/197 |
| | | | | | 375/240.13 |
| 2014/0153844 | A1* | 6/2014 | Jeon | ........................ | H04N 19/82 |
| | | | | | 382/300 |

FOREIGN PATENT DOCUMENTS

| CN | 102984523 A | 3/2013 |
| CN | 104244007 A | 12/2014 |

(Continued)

OTHER PUBLICATIONS

International Search Report for corresponding application . PCT/CN2016/072039 filed on Jan. 25, 2016; dated Apr. 27, 2016.
(Continued)

*Primary Examiner* — Chikaodili E Anyikire
(74) *Attorney, Agent, or Firm* — Cantor Colburn LLP

(57) ABSTRACT

The present disclosure provides a method and device for image coding and a method and device for image decoding, and the method includes: a representative pixel set of a coding block is constructed, and information for constructing the representative pixel set is determined; predicted values of pixel samples in the coding block are constructed, a generation manner for the predicted values including: constructing the predicted values of the pixel samples according to reconstructed pixel samples in an image region outside the coding block and pixel values of the representative pixel set; and the information for constructing the (Continued)

representative pixel set and information for constructing the predicted values are coded and written into a video bitstream.

16 Claims, 4 Drawing Sheets

(51) Int. Cl.
    *H04N 11/04*     (2006.01)
    *H04N 19/59*     (2014.01)
    *H04N 19/105*     (2014.01)
    *H04N 19/136*     (2014.01)
    *H04N 19/182*     (2014.01)
    *H04N 19/176*     (2014.01)
    *H04N 19/593*     (2014.01)
    *H04N 19/70*     (2014.01)

(52) U.S. Cl.
    CPC ......... *H04N 19/176* (2014.11); *H04N 19/182* (2014.11); *H04N 19/593* (2014.11); *H04N 19/70* (2014.11)

(56) References Cited

FOREIGN PATENT DOCUMENTS

| EP | 0790742 A2 | 8/1997 |
| EP | 3107289 A1 | 12/2016 |
| EP | 3211900 A1 | 8/2017 |

OTHER PUBLICATIONS

European Search Report for corresponding application EP16742728: dated Jan. 3, 2018.
Joshi R, et al., "Screen Content Coding Test Model 2 Encoder Description (SCM 2)", Joint Collaborative Team on Video Coding of ISO/IEC, Oct. 17, 2014, XP030116701.
Lin T. Et. Al, "Non-CE1: Enhancement to Palette Coding by Palette with Pixel Copy (PPC) Coding", 21. JCT-VC Meeting, Jun. 20, 2015, XP030117556.
Tao Lin et al, "Non-CE1: Further harmonization of PPC with no-pixel-copy palette" Jun. 23, 2015, XP030117630.
Y-C-Sun et al., "Non-RCE4: Cross-CU major color index prediction", 16. JCT-VC Meeting:, Joint Collaborative Team on Video Coding of ISO/IEC, Jan. 9, 2014, XP030115576.
Ye J., "Non-CE6: Copy Previous Mode 19", Joint Collaborative Team on Video Coding of ISO/IEC, Oct. 17, 2014, XP030116879.

* cited by examiner

METHOD AND DEVICE FOR IMAGE CODING AND METHOD AND DEVICE FOR IMAGE DECODING

TECHNICAL FIELD

The present disclosure relates to the field of image processing, and in particular to a method and device for image coding and a method and device for image decoding.

BACKGROUND

In related art, along with development of a television and a display into resolutions of super-high definition (4K) and extra super-high definition (8K) and development and popularization of a new-generation cloud computing and information processing mode and platform adopting a remote desktop as a typical representation form, a video image data compression requirement is also made for a higher-resolution composite image including an image shot by a camera and a computer screen image. An ultrahigh-compression rate and extremely high-quality data compression technology for video images becomes indispensable.

Performing ultrahigh-efficiency compression on the video images by fully utilizing characteristics of 4K/8K images and computer screen images is also a main objective of a latest international video compression standard High Efficiency Video Coding (HEVC) under formulation and a plurality of other international standards, national standards and industrial standards.

A natural form of a digital video signal of each image is a sequence of the image. A frame of image is usually a rectangular region formed by a plurality of pixels. And a digital video signal is a video image sequence, which is also called as a video sequence or a sequence sometimes for short, formed by dozens of and even hundreds of thousands of frames of images. Coding the digital video signal is to code each frame of image. At any time, a frame of image which is being coded is called as a current coding image. Similarly, decoding a video bitstream (called as a bitstream for short, also called as a bit stream) obtained by compressing the digital video signal is to decode a bitstream of each frame of image. At any time, a frame of image which is being decoded is called as a current decoding image. The current coding image and the current decoding image are collectively called as a current image.

In almost all international standards for video image coding such as Moving Picture Experts Group (MPEG-1/2/4) H.264/Advanced Video Coding (AVC) and HEVC, when a frame of image is coded (and correspondingly decoded), the frame of image is divided into a plurality of sub-images with M×M pixels, called as coding blocks (which are decoding blocks from the point of decoding, collectively called as coding and decoding blocks) or "Coding Units (CUs)". And the blocks of the image are coded one by one by taking a CU as a basic coding unit. M is usually 4, 8, 16, 32 and 64. Therefore, coding a video image sequence is to sequentially code each CU of each frame of image. At any time, a CU which is being coded is called as a current coding CU. Similarly, decoding a bitstream of a video image sequence is to sequentially decode each CU of each frame of image to finally reconstruct the whole video image sequence. At any time, a CU which is being decoded is called as a current decoding CU. The current coding CU and the current decoding CU are collectively called as a current CU.

In order to achieve adaptability to differences of image contents and properties of each part in a frame of image and pertinently and most effectively perform coding, sizes of each CU in the image are different, some being 8×8, some being 64×64 and the like. In order to seamlessly splice CUs with different sizes, a frame of image is usually divided into "Largest Coding Units (LCUs)" with completely the same size and N×N pixels at first. And then each LCU is further divided into multiple tree-structured CUs of which sizes may not be the same. Therefore, the LCUs are also called as "Coding Tree Units (CTUs)". For example, a frame of image is divided into LCUs with completely the same size and 64×64 pixels (N=64) at first, and a certain LCU is formed by three CUs with 32×32 pixels and four CUs with 16×16 pixels. And in such a manner, the seven tree-structured CUs form a CTU. The other LCU is formed by two CUs with 32×32 pixels, three CUs with 16×16 pixels and twenty CUs with 8×8 pixels. In such a manner, the 25 tree-structured CUs form the other CTU. Coding a frame of image is to sequentially code each CU in each CTU. In an international standard HEVC, LCU and CTU are synonyms.

A CU is further divided into a plurality of sub-regions. The sub-regions include, but not limited to, a Prediction Unit (PU), a Transform Unit (TU) and an Asymmetric Multi-Processing (AMP) region.

A colour pixel usually consists of three components. Two most common pixel colour formats include a Green, Blue and Red (GBR) colour format consisting of a green component, a blue component and a red component and a YUV colour format, consisting of a luma component and two chroma components, and colour formats collectively called as YUV actually include multiple colour formats, such as a YCbCr colour format. Therefore, when a CU is coded, the CU is divided into three component planes (a G plane, a B plane and an R plane or a Y plane, a U plane and a V plane). And the three component planes are coded respectively. And three components of each pixel are also bundled and combined into a triple, and the whole CU formed by these triples is coded. The former pixel and component arrangement manner is called as a planar format of an image (and its CUs), and the latter pixel and component arrangement manner is called as a packed format of the image (and its CUs). A GBR colour format and YUV colour format of a pixel are both three-component representation formats of the pixel.

Besides a three-component representation format of a pixel, another common representation format of the pixel in a conventional art is a palette index representation format. In the palette index representation format, a numerical value of a pixel is represented by an index of a palette. There are stored numerical values or approximate numerical values of three components of the pixel to be represented in a palette space, and an address of the palette is called as an index of the pixel stored in the address. An index represents a component of a pixel, and an index also represents three components of a pixel. There are one or more palettes. Under the condition that there are multiple palettes, a complete index is actually formed by two parts, i.e. a palette number and an index of the palette with the palette number. An index representation format of a pixel is to represent the pixel with an index. The index representation format of the pixel is also called as an indexed color or pseudo color representation format of the pixel in the conventional art, or is usually directly called as an indexed pixel or a pseudo pixel or a pixel index or an index. An index is also called as an exponent sometimes. Representing a pixel in an index representation format is also called as indexing or exponentiating.

Other common pixel representation formats in the conventional art include a CMYK representation format and a grayscale representation format.

A YUV colour format is also subdivided into a plurality of sub-formats according to whether to perform down-sampling on a chroma component or not: a YUV4:4:4 pixel colour format under which a pixel is formed by a Y component, a U component and a V component; a YUV4:2:2 pixel colour format under which two left and right adjacent pixels are formed by two Y components, a U component and a V component; and a YUV4:2:0 pixel colour format under which four left, right, upper and lower adjacent pixels arranged according to 2×2 spatial positions are formed by four Y components, a U component and a V component. A component is usually represented by a number with 8-16 bits. The YUV4:2:2 pixel colour format and the YUV4:2:0 pixel colour format are both obtained by executing chroma component down-sampling on the YUV4:4:4 pixel colour format. A pixel component is also called as a pixel sample, or is simply called as a sample.

A most basic element during coding or decoding is a pixel, is also a pixel component, and is further a pixel index (i.e. indexed pixel). A pixel or pixel component or indexed pixel adopted as the most basic element for coding or decoding is collectively called as a pixel sample, and is also collectively called as a pixel value sometimes or simply called as a sample.

In an application document of the present disclosure, "pixel sample", "pixel value", "sample", "indexed pixel" and "pixel index" are synonyms, and according to the context, it is clear that whether a "pixel" is represented or "a pixel component" is represented or an "indexed pixel" is represented or any one of the three is simultaneously represented. If it cannot get clear from the context, any one of the three is simultaneously represented.

In the application document of the present disclosure, a coding block or a decoding block (collectively called as a coding and decoding block) is a region formed by a plurality of pixels. A shape of the coding and decoding block is a rectangle, a square, a parallelogram, a trapezoid, a polygon, a round, an ellipse, a string and any other shape. The rectangle also includes a rectangle of which a width or a height is a pixel value and which is degenerated into a line (i.e. a line segment or a line shape). In a frame of image, each coding and decoding block has a different shape and size. In the frame of image, some or all of coding and decoding blocks have mutually overlapped parts, and all of the coding and decoding blocks are also not overlapped. A coding and decoding block is formed by one of "pixels", "components of the pixels" and "indexed pixels", or is also formed by mixing the three or mixing any two of the three. From a point of video image coding or decoding, a coding and decoding block refers to a region which is coded or decoded in a frame of image, including, but not limited to, at least one of: an LCU, a CTU, a CU, a sub-region of the CU, a PU, a TU, a string of pixels and a group of pixels.

A video image compression technology in the related art includes: a prediction manner (including, but not limited to, intraframe prediction and interframe prediction) and a copying manner (including, but not limited to, block copying, index copying, micro-block copying, strip copying, string copying, rectangular copying and point copying). Here, "copying" refers to copying an optimal matched pixel found by a coder. Therefore, from a point of a coder, the copying manner is also called as a matching manner (including, but not limited to, block matching, index matching, micro-block matching, strip matching, string matching, rectangular matching and point matching).

An important characteristic of the prediction manner and the copying manner is that reconstructed pixel samples (including at least one of completely reconstructed pixel samples and pixel samples which are partially reconstructed to different extents), called as predicted values (also called as reference values) of current coding or decoding pixel samples (called as current pixel samples for short), in an image region outside a current coding and decoding block (called as a current block for short) are copied and the predicted values are assigned to the current pixel samples as the reconstructed pixel samples of the current pixel samples.

In the prediction manner and copying manner in the related art, predicted values are obtained from reconstructed pixel samples in an image region outside a current block, and have no direct relation with pixel samples of the current block, so that there exists a problem that a mutual correlation is weaker and compression efficiency is lower if distances between positions of these reconstructed pixels and the current block are longer.

For the problem that the mutual correlation is weaker and compression efficiency is lower if distances between positions of these reconstructed pixels for obtaining predicted values and the current block are longer in the related art, no effective solution has been provided yet.

SUMMARY

At least some embodiments of present disclosure provide a method and device for image coding and a method and device for image decoding, so as at least to partially solve a problem that a mutual correlation is weaker and compression efficiency is lower if distances between positions of these reconstructed pixels for obtaining predicted values and a current block are longer in the related art.

In an embodiment of the present disclosure, a method for image coding is provided, which includes:

constructing a representative pixel set of a coding block, and determining information for constructing the representative pixel set; constructing predicted values of pixel samples in the coding block, a generation manner for the predicted values including: constructing the predicted values of the pixel samples according to reconstructed pixel samples in an image region outside the coding block and pixel values of the representative pixel set; and coding and writing the information for constructing the representative pixel set and information for constructing the predicted values into a video bitstream.

In one embodiment, the coding block is a coding region of an image, and includes at least one of: a Largest Coding Unit (LCU), a Coding Tree Unit (CTU), a Coding Unit (CU), a sub-region of the CU, a Prediction Unit (PU), a Transform Unit (TU), a pixel string, a pixel group, a pixel micro-block and a pixel strip; and the image region outside the coding block includes at least one of: an image region outside a variant of the coding block and an image region formed by pixels which have been partially coded.

In one embodiment, the generation manner for the predicted values includes one of: setting reconstructed pixel samples outside the coding block or variants of the reconstructed pixel samples as the predicted values; and setting the pixel values of the representative pixel set or variants of the pixel values of the representative pixel set as the predicted values.

In one embodiment, the predicted values of the pixel samples in the coding block are constructed by virtue of at least one of the following coding parameters, including: positions of the reconstructed pixel samples in an image; the information for constructing the representative pixel set; a number of pixels of the representative pixel set; positions of current coding pixel samples in the coding block; types of pixel components of the coding block, and one pixel component or two pixel components of the pixel components select the pixel values of the representative pixel set as predicted values, and the other pixel components, except the one pixel component or the two pixel components, of the pixel components select pixel values of the reconstructed pixel samples as predicted values; and flags for the predicted values.

In one embodiment, for the pixel samples in the coding block, the generation manner for the predicted values includes: for the reconstructed pixel samples outside the coding block, calculating distances between the reconstructed pixel samples and part or all of representative pixel samples of the representative pixel set, and setting the representative pixel samples of which the distances meet a first predefined condition as optimal representative pixel samples; and under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

In one embodiment, the distances are errors between pixels, the first predefined condition is that the errors are minimum, and the second predefined condition is that the errors are smaller than a first predetermined threshold value.

In one embodiment, setting the optimal representative pixel samples or the reconstructed pixel samples as the predicted values further includes at least one of: writing the flags indicating the predicted values into the video bitstream, writing at least one condition parameter for constructing the predicted values into the video bitstream, and the pixel samples meeting the at least one condition parameter are determined as the predicted values.

In one embodiment, writing the flags indicating the predicted values into the video bitstream includes at least one of: writing flags used for indicating predicted values selected for a whole sequence into at least one of the following parameter sets: a Video Parameter Set (VPS), a Sequence Parameter Set (SPS) and a Picture Parameter Set (PPS); writing flags used for indicating predicted values selected for an image into at least one of PPS and slice header; and writing flags used for indicating predicted values selected for a block layer into at least one of an LCU and a CU.

In one embodiment, writing the at least one condition parameter for construction of the predicted values into the video bitstream includes at least one of: writing the at least one condition parameter selected for a whole sequence into at least one of the following parameter sets: a VPS, an SPS and a PPS; writing the at least one condition parameter selected for an image into at least one of the PPS and slice header; and writing the at least one condition parameter selected for a block layer into at least one of an LCU layer and a CU layer.

In one embodiment, positions of the reconstructed pixel samples outside the coding block in an image are divided into at least one of rows and/or columns adjacent to the coding block; when the reconstructed pixel samples are positioned in the at least one of rows and/or columns adjacent to the coding block, numerical values of the representative pixel samples of the representative pixel set are set as the predicted values; and when the reconstructed pixel samples are positioned outside at least one of the rows and/or columns adjacent to the coding block, numerical values of the reconstructed pixel samples are set as the predicted values.

In one embodiment, flags for the predicted values are directly obtained from the video bitstream or obtained by deduction according to at least one existing parameter in the video bitstrearn, the flags for the predicted values are used for indicating one of numerical values of the representative pixel samples of the representative pixel set and numerical values of the reconstructed pixel samples outside the coding block to be selected as the current coding pixel samples in a coding process; and positions of the flags in the video bitstream include one of: a VPS, an SPS, a PPS, a slice header, a CTU header, a CU header, a coding block header and positions before one or a group or string of current coding pixel samples in the coding block.

In one embodiment, determining the predicted values according to the number of pixels in the representative pixel set includes: when the number of the pixels is smaller than a second predetermined threshold value, setting numerical values of the representative pixel samples of the representative pixel set as the predicted values; and when the number of the pixels is not smaller than the second predetermined threshold value, setting the numerical values of the reconstructed pixel samples as the predicted values.

In another embodiment of the present disclosure, a method for image decoding is provided, which includes that:

parsing a bitstream to acquire at least one decoding parameter of a decoding block, and the at least one decoding parameter includes at least one of the following parameters: at least one parameter for constructing a representative pixel set of the decoding block, and at least one parameter for constructing predicted values of pixel samples in the decoding block; and constructing the representative pixel set, and determining predicted values, and a generation manner for the predicted values includes: constructing the predicted values according to reconstructed pixel samples and pixel values of the representative pixel set.

In one embodiment, the decoding block is a decoding region in an image, and includes at least one of: a Largest Coding Unit (LCU), a Coding Tree Unit (CTU), a Coding Unit (CU), a sub-region of the CU, a Prediction Unit (PU), a Transform Unit (TU), a pixel string, a pixel group, a pixel micro-block and a pixel strip; and an image region outside the decoding block includes at least one of: an image region outside a variant of the decoding block and an image region formed by pixels which have been partially decoded.

In one embodiment, the generation manner for the predicted values includes one of: setting reconstructed pixel samples outside the decoding block or variants of the reconstructed pixel samples as the predicted values; and setting the pixel values of the representative pixel set or variants of the pixel values of the representative pixel set as the predicted values.

In one embodiment, the predicted values of the pixel samples in the decoding block are constructed by virtue of at least one of the following coding parameters, including: positions of the reconstructed pixel samples in an image; the parameter for constructing the representative pixel set; a number of pixels of the representative pixel set; positions of current decoding pixel samples in the decoding block; types of pixel components of the decoding block, and one pixel component or two pixel components of the pixel components select the pixel values of the representative pixel set as predicted values, and the other pixel components, except the one pixel component or the two pixel components, of the pixel components select pixel numerical values of the reconstructed pixel samples as predicted values; and flags for the predicted values.

In one embodiment, for the pixel samples in the decoding block, the generation manner for the predicted values includes: for the reconstructed pixel samples outside the decoding block, calculating distances between the reconstructed pixel samples and part or all of representative pixel samples of the representative pixel set, and setting the representative pixel samples of which the distances meet a first predefined condition as optimal representative pixel samples; and under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

In one embodiment, the distances are errors between pixels, the first predefined condition is that the errors are minimum, and the second predefined condition is that the errors are smaller than a first predetermined threshold value.

In one embodiment, setting the optimal representative pixel samples or the reconstructed pixel samples as the predicted values includes at least one of: parsing the flags in the bitstream, and setting values indicated by the flags as the predicted values; and, parsing at least one condition parameter in the bitstream, and setting pixel samples meeting the at least one condition parameter as the predicted values.

In one embodiment, parsing the flags in the bitstream includes at least one of: parsing a parameter set, including at least one of a Video Parameter Set (VPS), a Sequence Parameter Set (SPS) and a Picture Parameter Set (PPS), where flags used for indicating predicted values selected for a whole sequence are located; parsing at least one of a PPS and slice header where flags used for indicating predicted values selected for an image are located; and parsing at least one of an LCU layer and a CU layer where flags used for indicating predicted values selected for a block layer are located.

In one embodiment, parsing the at least one condition parameter in the bitstream includes at least one of: parsing a parameter set where the at least one condition parameter selected for a sequence is located, and the parameter set includes at least one of: a VPS, an SPS and a PPS; parsing at least one of the PPS and slice header where the at least one condition parameter selected for an image is located; and parsing at least one of an LCU layer and a CU layer where the at least one condition parameter selected for a block layer is located.

In one embodiment, dividing the positions of the reconstructed pixel samples outside the decoding block in the image into at least one of rows and/or columns adjacent to the decoding block; when the reconstructed pixel samples are positioned in at least one of rows and/or columns adjacent to the decoding block, setting numerical values of the representative pixel samples of the representative pixel set as the predicted values; and when the reconstructed pixel samples are positioned outside at least one of rows and/or columns adjacent to the coding block, setting numerical values of the reconstructed pixel samples as the predicted values.

In one embodiment, parsing at least one of the following data units in the bitstream to obtain the flags for the predicted values, the data units including at least one of: a VPS, an SPS, a PPS, a slice header, a CTU header, a CU header, a coding block header and data units before one or a group or string of current coding pixel samples in a coding block, and the flags for the predicted values are directly obtained from the bitstream or obtained by deduction according to at least one existing parameter in the video bitstream, and the flags for the predicted values are used for indicating whether numerical values of the representative pixel samples of the representative pixel set or numerical values of the reconstructed pixel samples outside the decoding block are set as the predicted values.

In one embodiment, determining the predicted values according to the number of pixels in the representative pixel set includes: when the number of the pixels is to smaller than a second predetermined threshold value, setting numerical values of the representative pixel samples of the representative pixel set as the predicted values; and when the number of the pixels is not smaller than the second predetermined threshold value, setting the numerical values of the reconstructed pixel samples as the predicted values.

In another embodiment of the present disclosure, a device for image coding is provided, which includes that:

a first determination component, arranged to construct a representative pixel set of a coding block and determine information for constructing the representative pixel set; a second determination component, arranged to construct predicted values of pixel samples of the coding block, a generation manner for the predicted values including: constructing the predicted values of the pixel samples according to reconstructed pixel samples in an image region outside the coding block and pixel values of the representative pixel set; and a coding component, arranged to code and write the information for constructing the representative pixel set and information for constructing the predicted values into a bitstream.

In another embodiment of the present disclosure, a device for image decoding is provided, which includes that:

a parsing component, arranged to parse a bitstream to acquire at least one decoding parameter of a decoding block, and the at least one decoding parameter includes at least one of the following parameters: at least one parameter for constructing a representative pixel set of the decoding block, and at least one parameter for constructing predicted values of pixel samples in the decoding block; and a third determination component, arranged to construct the representative pixel set, and determine predicted values, and a generation manner for the predicted values includes: constructing the predicted values according to reconstructed pixel samples and pixel values of the representative pixel set.

According to at least some embodiments of the present disclosure, the representative pixel set of the coding block is constructed, the information for constructing the representative pixel set is determined, the predicted values of the pixel samples in the coding block are constructed, the generation manner for the predicted values including: constructing the predicted values of the pixel samples according to the reconstructed pixel samples in the image region outside the coding block and the pixel values of the representative pixel set, and the information for constructing the representative pixel set and the information for constructing the predicted values are coded and written into the video bitstream, so that a problem that a mutual correlation is weaker and compression efficiency is lower if distances between positions of these reconstructed pixels for obtaining predicted values and a current block are longer in the related art is solved, correlation between predicted values from the image region outside a current block and current pixel samples is improved, and compression efficiency is effectively improved.

DETAILED DESCRIPTION

The present disclosure will be described below in detail with reference to the drawings and embodiments. It is important to note that the embodiments in the present disclosure and characteristics in the embodiments are combined under the condition of no conflicts.

It is important to note that terms "first", "second" and the like in the specification, claims and drawings of the present disclosure are adopted not to describe a specific sequence or order but to distinguish similar objects.

Figure 1:
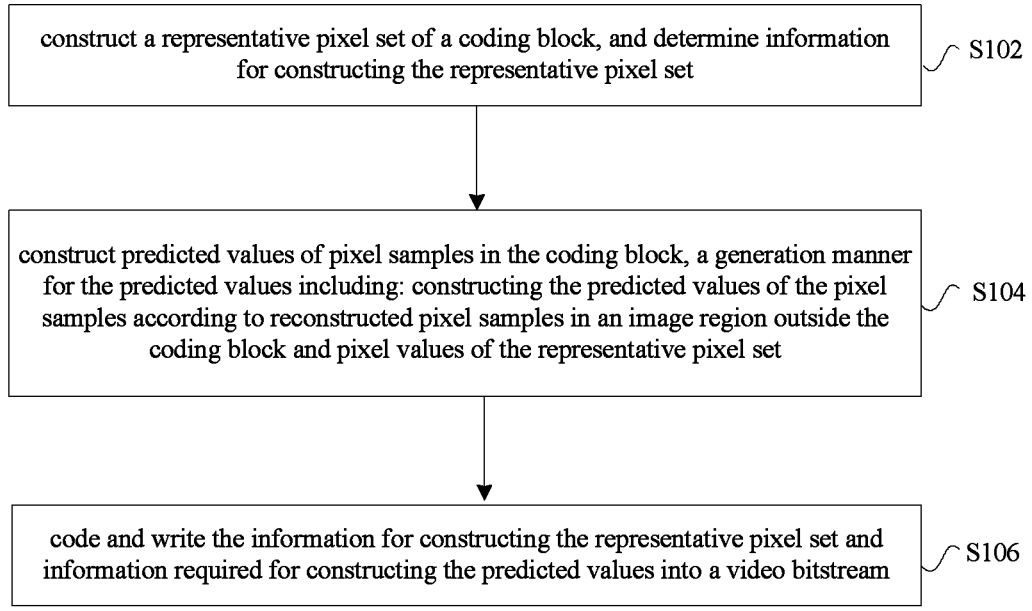
FIG. 1 is a flowchart of a method for image coding according to an embodiment of the present disclosure.

An embodiment provides a method for image coding. FIG. 1 is a flowchart of a method for image coding according to an embodiment of the present disclosure. As shown in FIG. 1, the flow includes the following steps.

At step S102: a representative pixel set of a coding block is constructed, and information for constructing the representative pixel set is determined.

At step S104: predicted values of pixel samples in the coding block are constructed, a generation manner for the predicted values including: constructing the predicted values of the pixel samples according to reconstructed pixel samples in an image region outside the coding block and pixel values of the representative pixel set.

At step S106: the information for constructing the representative pixel set and information for constructing the predicted values are coded and written into a video bitstream.

By the steps, the representative pixel set of the coding block is constructed, the information for constructing the representative pixel set is determined, the predicted values of the pixel samples in the coding block are constructed, the generation manner for the predicted values including: constructing the predicted values of the pixel samples according to the reconstructed pixel samples in the image region outside the coding block and the pixel values of the representative pixel set, and the information for constructing the representative pixel set and the information for constructing the predicted values are coded and written into the video bitstream, so that a problem that a mutual correlation is weaker and compression efficiency is lower if distances between positions of these reconstructed pixels for obtaining predicted values and a current block are longer in the related art is solved, correlation between predicted values from the image region outside a current block and current pixel samples is improved, and compression efficiency is effectively improved.

In the embodiment, the coding block is a coding region of an image, and includes at least one of: an LCU, a CTU, a CU, a sub-region of the CU, a PU, a TU, a pixel string, a pixel group, a pixel micro-block and a pixel strip; and the image region outside the coding block includes at least one of: an image region outside a variant of the coding block and an image region formed by pixels which have been partially coded.

In the embodiment, the generation manner for the predicted values includes one of:

setting reconstructed pixel samples outside the coding block or variants of the reconstructed pixel samples as the predicted values; and setting the pixel values of the representative pixel set or variants of the pixel values of the representative pixel set as the predicted values.

In the embodiment, the predicted values of the pixel samples in the coding block are constructed by virtue of at least one of the following coding parameters, including:

positions of the reconstructed pixel samples in an image;

the information for constructing the representative pixel set;

a number of pixels of the representative pixel set;

positions of current coding pixel samples in the coding block;

types of pixel components of the coding block, and one pixel component or two pixel components of the pixel components select the pixel values of the representative pixel set as predicted values, and the other pixel components, except the one pixel component or the two pixel components, of the pixel components select pixel numerical values of the reconstructed pixel samples as predicted values; and flags for the predicted values.

In the embodiment, for the pixel samples in the coding block, the generation manner for the predicted values includes:

for the reconstructed pixel samples outside the coding block, calculating distances between the reconstructed pixel samples and part or all of representative pixel samples of the representative pixel set, and setting the representative pixel samples of which the distances meet a first predefined condition as optimal representative pixel samples; and under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

In the embodiment, the distances are errors between pixels, the first predefined condition is that the errors are minimum, and the second predefined condition is that the errors are smaller than a first predetermined threshold value.

In the embodiment, setting the optimal representative pixel samples or the reconstructed pixel samples as the predicted values includes at least one of:

writing the flags indicating the predicted values into the video bitstream, and, writing at least one condition parameter for constructing the predicted values into the video bitstream, and the pixel samples meeting the at least one condition parameter are determined as the predicted values.

In the embodiment, writing the flags indicating the predicted values into the video bitstream includes at least one of:

writing flags used for indicating predicted values selected for a whole sequence into at least one of the following parameter sets: a VPS, an SPS and a PPS;

writing flags used for indicating predicted values selected for an image into at least one of a PPS and slice header; and writing flags used for indicating predicted values selected for a block layer into at least one of an LCU and a CU.

In the embodiment, writing the at least one condition parameter for construction of the predicted values into the video bitstream includes at least one of:

writing the at least one condition parameter selected for a whole sequence into at least one of the following parameter sets: a VPS, an SPS and a PPS;

writing the at least one condition parameter selected for an image into at least one of the PPS and the slice header; and writing the at least one condition parameter selected for a block layer into at least one of an LCU layer and a CU layer.

In the embodiment, positions of the reconstructed pixel samples outside the coding block in the image are divided into at least one of rows and/or columns adjacent to the coding block. When the reconstructed pixel samples are positioned in at least one of the rows and/or columns adjacent to the coding block, numerical values of the representative pixel samples of the representative pixel set are set as the predicted values. When the reconstructed pixel samples are positioned outside at least one of the rows and/or columns adjacent to the coding block, the numerical values of the reconstructed pixel samples are set as the predicted values.

In the embodiment, the flags for the predicted values may be directly obtained from the video bitstream or obtained by deduction according to at least one existing parameter in the video bitstream. The flags for the predicted values are used for indicating one of numerical values of the representative pixel samples of the representative pixel set and numerical values of the reconstructed pixel samples outside the coding block to be selected as the current coding pixel samples in a coding process. Positions of the flags in the video bitstream include one of: a VPS, an SPS, a PPS, a slice header, a CTU header, a CU header, a coding block header and positions before one or a group or string of current coding pixel samples in the coding block.

In the embodiment, determining the predicted values according to the number of pixels in the representative pixel set includes: when the number of the pixels is smaller than a second predetermined threshold value, setting numerical values of the representative pixel samples of the representative pixel set as the predicted values; and when the number of the pixels is not smaller than the second predetermined threshold value, setting the numerical values of the reconstructed pixel samples as the predicted values.

Figure 2:
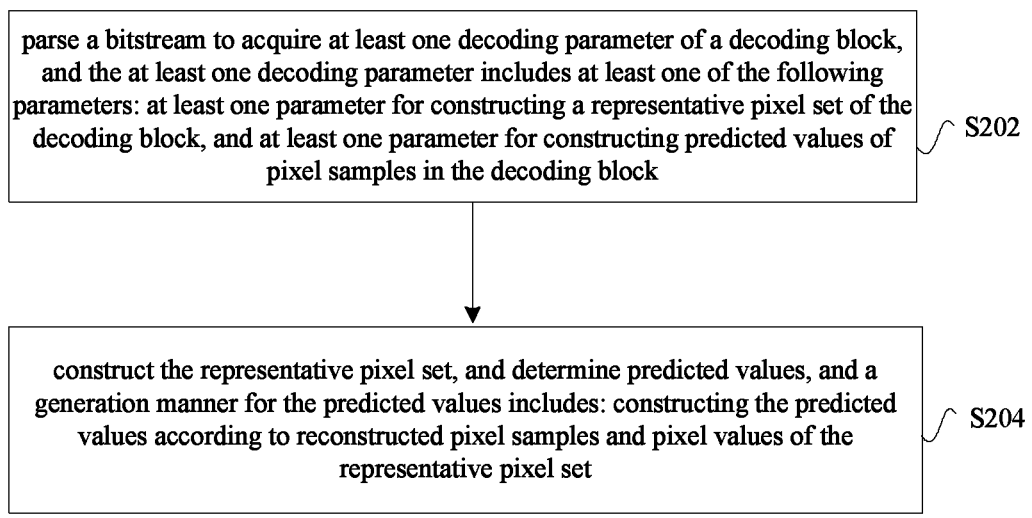
FIG. 2 is a flowchart of a method for image decoding according to an embodiment of the present disclosure.

An embodiment provides a method for image decoding. FIG. 2 is a flowchart of a method for image decoding according to an embodiment of the present disclosure. As shown in FIG. 2, the flow includes the following steps.

At step S202: a bitstream is parsed to acquire at least one decoding parameter of a decoding block, and the at least one decoding parameter includes at least one of the following parameters: at least one parameter for constructing a representative pixel set of the decoding block, and at least one parameter for constructing predicted values of pixel samples in the decoding block.

At step S204: the representative pixel set is constructed, and the predicted values are determined, and a generation manner for the predicted values includes: constructing the predicted values according to reconstructed pixel samples and pixel values of the representative pixel set.

By the steps, the bitstream is parsed to acquire the at least one decoding parameter of the decoding block, and the at least one decoding parameter includes at least one of the following parameters: the at least one parameter for constructing the representative pixel set of the decoding block, and the at least one parameter for constructing the predicted values of the pixel samples in the decoding block; and the representative pixel set is constructed, and the predicted values are determined, and the generation manner for the predicted values includes: constructing the predicted values according to the reconstructed pixel samples and the pixel values of the representative pixel set, so that the problem that a mutual correlation is weaker and compression efficiency is lower if distances between positions of these reconstructed pixels for obtaining predicted values and a current block are longer in the related art is solved, the correlation between the predicted values from the image region outside the current block and the current pixel samples is improved, and the compression efficiency is effectively improved.

In the embodiment, the decoding block is a decoding region in an image, and includes at least one of: an LCU, a CTU, a CU, a sub-region of the CU, a PU, a TU, a pixel string, a pixel group, a pixel micro-block and a pixel strip; and an image region outside the decoding block includes at least one of: an image region outside a variant of the decoding block and an image region formed by pixels which have been partially decoded.

In the embodiment, the generation manner for the predicted values includes one of: setting reconstructed pixel samples outside the decoding block or variants of the reconstructed pixel samples as the predicted values; and setting the pixel values of the representative pixel set or variants of the pixel values of the representative pixel set as the predicted values.

In the embodiment, the predicted values of the pixel samples in the decoding block are constructed by virtue of at least one of the following predefined decoding parameters: positions of the reconstructed pixel samples in the image; the parameter for constructing the representative pixel set; a number of pixels of the representative pixel set; positions of current decoding pixel samples in the decoding block; types of pixel components of the decoding block, and one pixel component or two pixel components of the pixel components select the pixel values of the representative pixel set as predicted values, and the other pixel components, except the one pixel component or the two pixel components, of the pixel components select pixel numerical values of the reconstructed pixel samples as predicted values; and flags for the predicted values.

In the embodiment, for the pixel samples in the decoding block, the generation manner for the predicted values includes:

for the reconstructed pixel samples outside the decoding block, calculating distances between the reconstructed pixel samples and part or all of representative pixel samples of the representative pixel set, and setting the representative pixel samples of which the distances meet a first predefined condition as optimal representative pixel samples; and under the condition that the distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

In the embodiment, the distances are errors between pixels, the first predefined condition is that the errors are minimum, and the second predefined condition is that the errors are smaller than a first predetermined threshold value.

In the embodiment, setting the optimal representative pixel samples or the reconstructed pixel samples as the predicted values includes at least one of: parsing the flags in the bitstream, and setting values indicated by the flags as the predicted values; and parsing at least one condition parameter in the bitstream, and setting pixel samples meeting the at least one condition parameter as the predicted values.

In the embodiment, parsing the flags in the bitstream includes at least one of: parsing a parameter set, including at least one of a VPS, an SPS and a PPS, where flags used for indicating predicted values selected for a whole sequence are located; parsing at least one of the PPS and slice header where flags used for indicating predicted values selected for an image are located; and parsing at least one of an LCU layer and a CU layer where flags configured to indicating predicted values selected for a block layer are located.

In the embodiment, parsing the at least one condition parameter in the bitstream includes at least one of: parsing a parameter set where the at least one condition parameter selected for a sequence is located, and the parameter set includes at least one of: a VPS, an SPS and a PPS; parsing at least one of the PPS and slice header where the at least one condition parameter selected for an image is located; and parsing at least one of the LCU layer and a CU layer where the at least one condition parameter selected for the block layer is located.

In the embodiment, the positions of the reconstructed pixel samples outside the decoding block in the image are divided into at least one of rows and/or columns adjacent to the decoding block. When the reconstructed pixel samples are positioned in at least one of rows and/or columns adjacent to the decoding block, numerical values of the representative pixel samples of the representative pixel set are set as the predicted values. When the reconstructed pixel samples are positioned outside at least one of the rows and/or columns adjacent to the coding block, the numerical values of the reconstructed pixel samples are set as the to predicted values.

In the embodiment, at least one of the following data units in the bitstream is parsed to obtain the flags for the predicted values, the data units including at least one of: the VPS, the SPS, the PPS, a slice header, a CTU header, a CU header, a coding block header and data units before one or a group or string of current coding pixel samples in a coding block. And the flags for the predicted values are directly obtained from the bitstream or obtained by deduction according to at least one existing parameter in the video bitstream, and the flags for the predicted values are used for indicating whether the numerical values of the representative pixel samples of the representative pixel set or the numerical values of the reconstructed pixel samples outside the decoding block are set as the predicted values.

In the embodiment, determining the predicted values according to the number of the pixels in the representative pixel set includes: when the number of the pixels is smaller than a second predetermined threshold value, setting the numerical values of the representative pixel samples of the representative pixel set as the predicted values; and when the number of the pixels is not smaller than the second predetermined threshold value, setting the numerical values of the reconstructed pixel samples as the predicted values.

An embodiment also provides a device for image coding, which is arranged to implement the abovementioned embodiment and exemplary implementation modes, and what has been described will not be elaborated. For example, term "component", used below, is a combination of at least one of software and hardware capable of realizing a preset function. Although the device described in the following embodiment is preferably implemented with software, implementation with hardware or a combination of the software and the hardware is also possible and conceivable.

Figure 3:
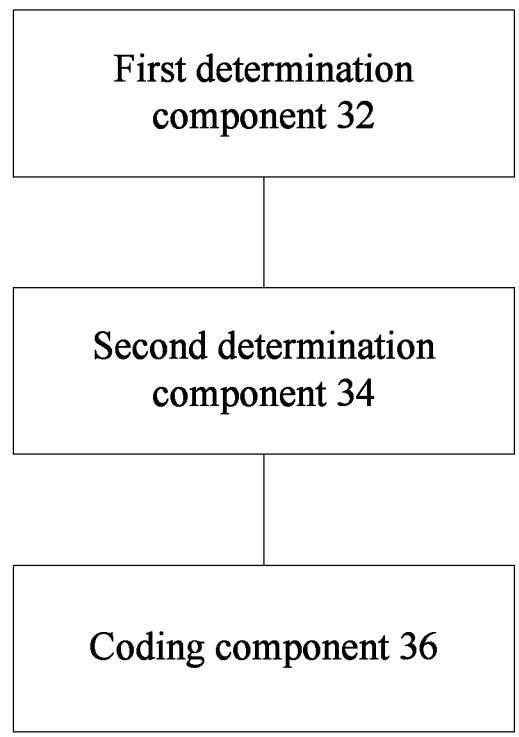
FIG. 3 is a structural block diagram of a device for image coding according to a first exemplary embodiment of the present disclosure.

FIG. 3 is a structural block diagram of a device for image coding according to a first exemplary embodiment of the present disclosure. As shown in FIG. 3, the device includes:

a first determination component 32, arranged to construct a representative pixel set of a coding block and determine information for constructing the representative pixel set;

a second determination component 34, connected with the first determination component 32 and arranged to construct predicted values of pixel samples of the to coding block, a generation manner for the predicted values including: constructing the predicted values of the pixel samples according to reconstructed pixel samples in an image region outside the coding block and pixel values of the representative pixel set; and a coding component 36, connected with the second determination component 34 and arranged to code and write the information for constructing the representative pixel set and information for constructing the predicted values into a bitstream.

By the steps, the first determination component 32 constructs the representative pixel set of the coding block, and determines the information for constructing the representative pixel set, the second determination component 34 constructs the predicted values of the pixel samples in the coding block, the generation manner for the predicted values including: constructing the predicted values of the pixel samples according to the reconstructed pixel samples in the image region outside the coding block and the pixel values of the representative pixel set, and the coding component 36 codes and writes the information for constructing the representative pixel set and the information for constructing the predicted values into the video bitstream, so that the problem that a mutual correlation is weaker and compression efficiency is lower if distances between positions of these reconstructed pixels for obtaining predicted values and a current block are longer in the related art is solved, the correlation between the predicted values from the image region outside the current block and the current pixel samples is improved, and the compression efficiency is effectively improved.

Figure 4:
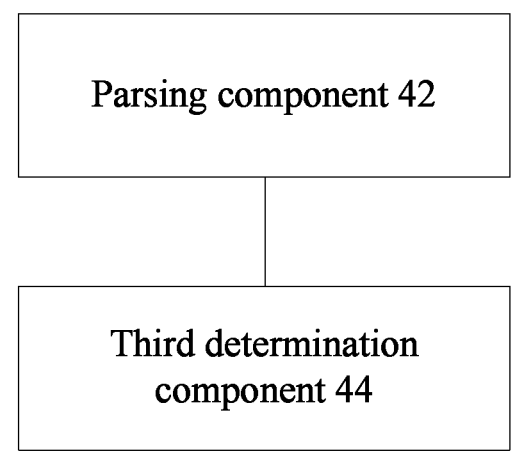
FIG. 4 is a structural block diagram of a device for image decoding according to a second exemplary embodiment of the present disclosure.

FIG. 4 is a structural block diagram of a device for image decoding according to a second exemplary embodiment of the present disclosure. As shown in FIG. 4, the device includes:

a parsing component 42, arranged to parse a bitstream to acquire at least one decoding parameter of a decoding block, and the decoding parameter includes at least one of the following parameters: at least one parameter for constructing a representative pixel set of the decoding block, and at least one parameter for constructing predicted values of pixel samples in the decoding block; and a third determination component 44, connected with the parsing component 42 and arranged to construct the representative pixel set, and determine the predicted values, and a generation manner for the predicted values includes: constructing the predicted values according to reconstructed pixel samples and pixel values of the representative pixel set.

By the steps, the parsing component 42 parses the bitstream to acquire the decoding parameter of the decoding block, and the decoding parameter includes at least one of the following parameters: the parameter for constructing the representative pixel set of the decoding block, and the parameter for constructing the predicted values of the pixel samples in the decoding block; and the third determination component 44 constructs the representative pixel set, and determines the predicted values, and the generation manner for the predicted values includes: constructing the predicted values according to the reconstructed pixel samples and the pixel values of the representative pixel set, so that the problem that a mutual correlation is weaker and compression efficiency is lower if distances between positions of these reconstructed pixels for obtaining predicted values and a current block are longer in the related art is solved, the correlation between the predicted values from the image region outside the current block and the current pixel samples is improved, and the compression efficiency is effectively improved.

It is important to note that each component is implemented through software or hardware, and under the latter condition, is implemented in, but not limited to, the following manner: the components are all positioned in the same processor, or the components are positioned in multiple processors respectively.

Detailed descriptions will be made below with reference to an exemplary embodiment of the present disclosure.

A main technical characteristic of the exemplary embodiment of the present disclosure is that a representative pixel set of a current block is constructed when the current block is coded or decoded and predicted values of part or all of current pixel samples are obtained according to a predetermined rule from reconstructed pixel samples in an image region outside the current block and pixel numerical values of the representative pixel set of the current block, optionally in combination with another coding and decoding parameter.

Figure 5:
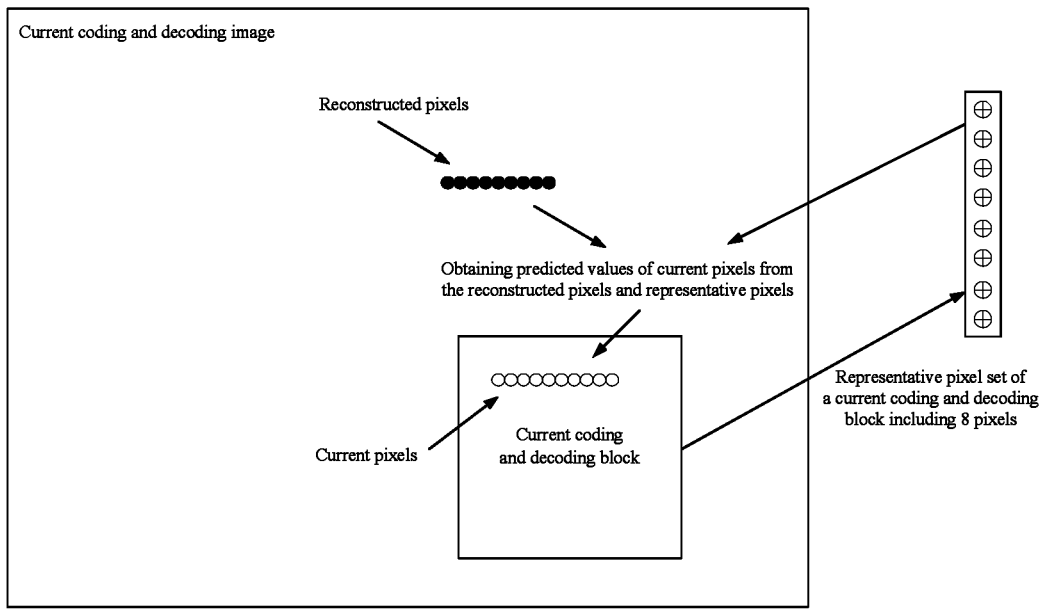
FIG. 5 is a schematic diagram of obtaining predicted values of current pixels according to an exemplary embodiment of the present disclosure.

FIG. 5 is a schematic diagram of obtaining predicted values of current pixels according to an exemplary embodiment of the present disclosure. A representative pixel set including 8 representative pixels is constructed from the current block. For part or all of pixels of the current block, the predicted values of part or all of the pixels of the current block are obtained from reconstructed pixels in the image region outside the current block and the representative pixels of the current block.

The pixels shown in FIG. 5 adopt a packed format, and also adopt a planar format. Therefore, methods of the exemplary embodiment of the present disclosure are applied to coding or decoding of pixels of a coding block or a decoding block in the packed format, and are also applied to coding or decoding of pixel samples of a plane in the coding block or the decoding block in the planar format.

In the coding method of the exemplary embodiment of the present disclosure, a most basic peculiar technical characteristic is that: properties of a current coding block are statistically analysed, and a representative pixel set, also called as a palette, of the current coding block is constructed; predicted values most matched with pixels of the current coding block are found. A generation manner for the predicted values includes, but not limited to, calculation according to a predetermined rule from reconstructed pixel samples in an image region outside the current coding block and pixel samples of the representative pixel set of the current coding block, optionally in combination with another coding parameter. And information for constructing the representative pixel set is written into a compressed video bitstream, and information required by obtaining the predicted values is written into the compressed video bitstream.

In the decoding method of the exemplary embodiment of the present disclosure, a most basic peculiar technical characteristic is that: when compressed bitstream data of a current decoding block is decoded, the bitstream data is parsed to obtain information for constructing a representative pixel set, also called as a palette, of the current decoding block, and is parsed to obtain information required by calculation of predicted values of pixels of the current decoding block. And a calculation manner for the predicted values includes, but not limited to, calculation according to a predetermined rule from reconstructed pixel samples in an image region outside the current decoding block and pixel numerical values of the representative pixel set of the current decoding block, optionally in combination with another decoding parameter.

The technical characteristics of the present disclosure are described above through a plurality of specific examples. Those skilled in the art easily know about other advantages and effects of the present disclosure from contents disclosed by the specification. The present disclosure is also implemented or applied through other different specific implementation modes, and various modifications or variations may also be made to each detail in the specification on the basis of different viewpoints and applications without departing from the spirit of the present disclosure.

Figure 6:
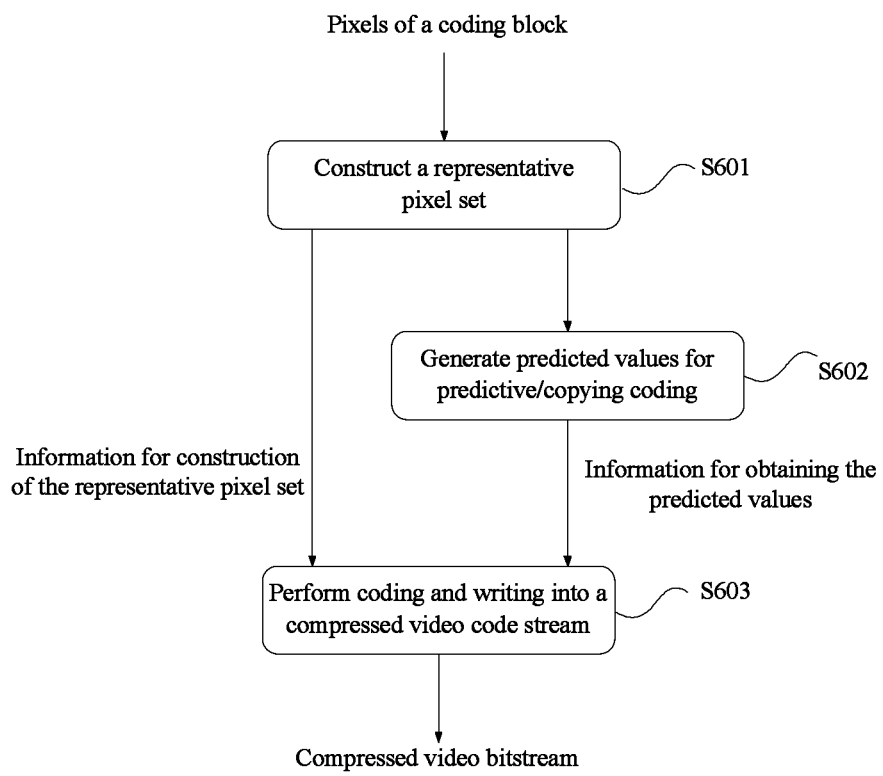
FIG. 6 is a flowchart of a coding method according to an exemplary embodiment of the present disclosure.

FIG. 6 is a flowchart of a coding method according to an exemplary embodiment of the present disclosure. As shown in FIG. 6, the coding method of the present disclosure includes, but not limited to, the following steps.

At step S601: a representative pixel set of a coding block is constructed, and information for constructing the representative pixel set is at least generated.

At step S602: predictive or copying coding is performed on the coding block to at least generate predicted values of pixel samples of the coding block, a generation manner for the predicted values including, but not limited to, calculation according to a predetermined rule from reconstructed pixel samples in an image region outside the coding block and pixel numerical values of the representative pixel set, optionally in combination with another coding parameter, and positions of the reconstructed pixel samples in the image region being specified by displacement vectors (also called as motion vectors, copying positions or the like) between the reconstructed pixel samples and current coding pixel samples.

At step S603: the information for constructing the representative pixel set and information required by obtaining the predicted values are at least coded and written into a compressed video bitstream.

Figure 7:
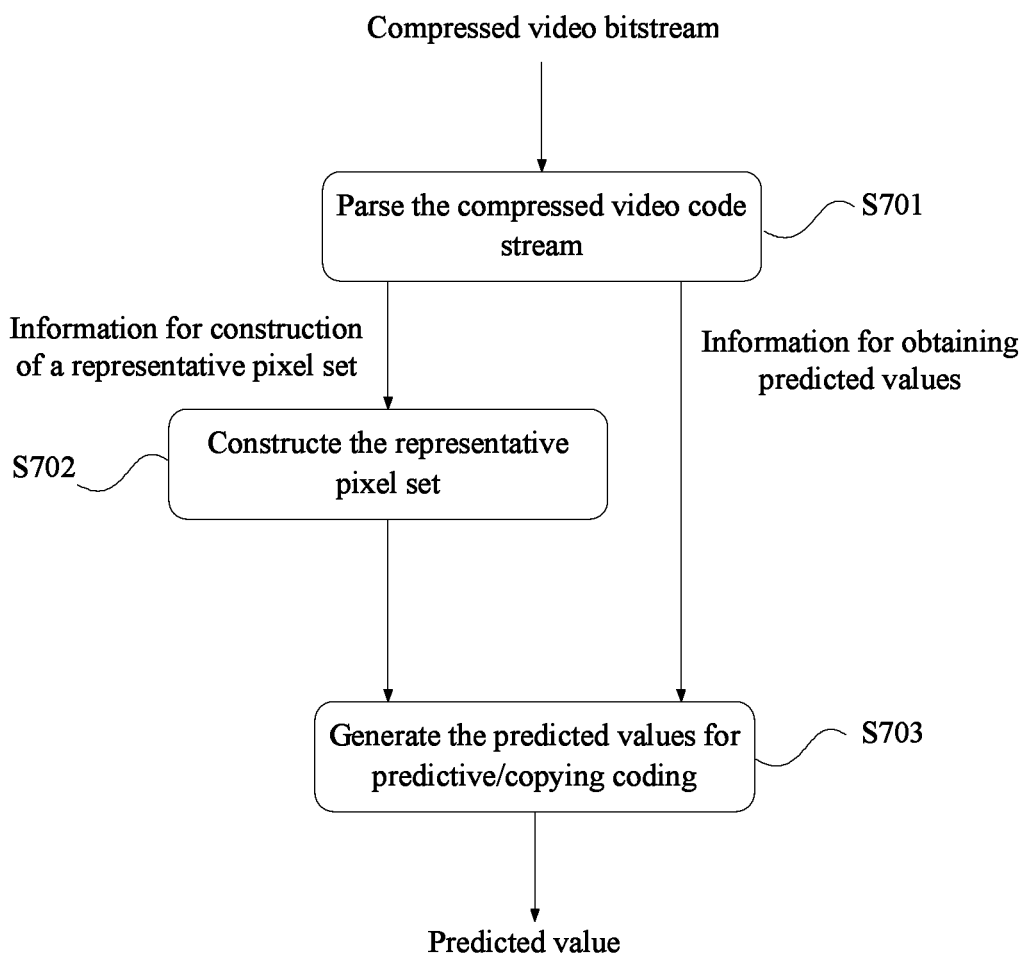
FIG. 7 is a flowchart of a decoding method according to an exemplary embodiment of the present disclosure.

FIG. 7 is a flowchart of a decoding method according to an exemplary embodiment of the present disclosure. As shown in FIG. 7, the decoding method of the present disclosure includes, but not limited to, the following steps.

At step S701: a video bitstream is parsed to at least obtain information for constructing a representative pixel set of a decoding block and information required by obtaining predicted values of pixel samples of the decoding block.

At step S702: the representative pixel set is constructed.

At step S703: the predicted values are at least generated, a generation manner for the predicted values including, but not limited to, calculation according to a predetermined rule from reconstructed pixel samples in an image region outside the decoding block and pixel numerical values of the representative pixel set, optionally in combination with another decoding parameter, and positions of the reconstructed pixel samples in the image region being specified by displacement vectors (also called as motion vectors, copying positions or the like) between the reconstructed pixel samples and current coding pixel samples.

The explanatory charts provided above are intended to schematically describe the basic concept of the present disclosure, the explanatory charts display components directly related to the present disclosure, and are not drawn according to a number, shapes and sizes of components during practical implementation, a form, number and proportion of each component are freely changed during practical implementation, and a component layout form is also more complex.

The below is more implementation details and variants of the present disclosure.

Variants of the current coding block or the current decoding block: a variant of the current coding block or the current decoding block is a pixel group or pixel string or pixel micro-block and pixel strip to be coded or to be decoded. Correspondingly, the image region outside the coding block or the decoding block is an image region formed by pixels which have at least been partially coded or pixels which have at least been partially decoded.

Embodiment 1 of the present disclosure provides a generation manner for the predicted values.

The generation manner for the predicted values at least includes the following steps. According to the predetermined value, the reconstructed pixel samples outside the coding and decoding block or variants of the reconstructed pixel samples outside the coding and decoding block are selected as the predicted values, or the pixel numerical values of the representative pixel set or variants of the pixel numerical values of the representative pixel set are selected as the predicted values. In the coding and decoding block, part or all of the current pixel samples adopt the reconstructed pixel samples outside the coding and decoding block or variants of the reconstructed pixel samples outside the coding and decoding block as predicted values, and part or all of the current pixel samples adopt the pixel numerical values of the representative pixel set or variants of the pixel numerical values of the representative pixel set as predicted values. The variants include, but not limited to, filtering and transformation.

Embodiment 2 of the present disclosure provides another generation manner for the predicted values.

The generation manner for the predicted values determines the predicted values at least according to part or all or combination of the following parameters:

1) positions of the reconstructed pixel samples outside the coding and decoding block in a current image, and the positions are usually specified by the displacement vectors (also called as the motion vectors, the copying positions or the like);

2) numerical values of the reconstructed pixel samples outside the coding and decoding block, and the positions of the reconstructed pixel samples are usually specified by the displacement vectors (also called as the motion vectors, the copying positions or the like);

3) numerical values of representative pixel samples of the coding and decoding block;

4) construction of the representative pixel set of the coding and decoding block;

5) a number of pixels of the representative pixel set of the coding and decoding block;

6) positions of the current coding and decoded pixel samples in the coding and decoding block;

7) types of pixel components, one pixel component (such as a Y component) or two pixel components (such as a G component and an R component) selecting the numerical values of the representative pixel samples as predicted values, other pixel components selecting the numerical values of the reconstructed pixel samples outside the coding and decoding block as predicted values, and the positions of the reconstructed pixel samples are usually specified by the displacement vectors (also called as the motion vectors, the copying positions or the like); and 8) flags directly acquired or implicitly deduced in the bitstream.

Embodiment 3 of the present disclosure provides another generation manner for the predicted values.

For a current pixel sample of the coding and decoding block, the generation manner for the predicted value at least includes the following steps.

For a reconstructed pixel sample outside the coding and decoding block, distances between the reconstructed pixel sample and part or all of the representative pixel samples of the representative pixel set is calculated, and the representative pixel sample with an optimal distance, called as an optimal representative pixel sample is determined.

When the distance between the optimal representative pixel sample and the reconstructed pixel sample meets a predetermined condition, the numerical value of the optimal representative pixel sample is selected as the predicted value. Otherwise the numerical value of the reconstructed pixel sample is selected as the predicted value.

Embodiment 4 of the present disclosure provides another generation manner for the predicted values.

The distance in the embodiment 3 is an error between pixels, and the predetermined condition is that the error is smaller than a predetermined threshold value. That is, for a current pixel sample of the coding and decoding block, the generation manner for the predicted value at least includes the following steps.

For a reconstructed pixel sample outside the coding and decoding block, errors between the reconstructed pixel sample and part or all of the representative pixel samples of the representative pixel set are calculated, and the representative pixel sample with a small error, called as an optimal representative pixel sample is determined.

When the error between the optimal representative pixel sample and the reconstructed pixel sample is smaller than the predetermined threshold value, the numerical value of the optimal representative pixel sample is selected as the predicted value, otherwise selecting the numerical value of the reconstructed pixel sample as the predicted value.

Embodiment 5 of the present disclosure provides another generation manner for the predicted values.

The positions of the reconstructed pixel samples outside the coding and decoding block in the current image in embodiment 2 are divided into a plurality of rows and/or columns (usually 1-5 rows and/or 1-5 columns) directly adjacent to the coding and decoding block and other positions.

When the reconstructed pixel samples are positioned in the plurality of rows and/or columns directly adjacent to the coding and decoding block, the numerical values of the representative pixel samples are selected as the predicted values.

Otherwise, the reconstructed pixel samples are positioned outside the plurality of rows and/or columns directly adjacent to the coding and decoding block, the numerical values of the reconstructed pixel samples are selected as the predicted values.

Embodiment 6 of the present disclosure provides another generation manner for the predicted values.

The flags in embodiment 2 directly or indirectly (in an implicit deduction form) appear at the following positions in the bitstream to determine whether the current coding and decoded pixel samples in a subsequent coding and decoding process to select the numerical values of the representative pixel samples as the predicted values or select the numerical values of the reconstructed pixel samples outside the coding and decoding block as the predicted values:

1) a VPS: usually syntactic elements directly existing or implicitly deduced in the VPS;
2) an SPS: usually syntactic elements directly existing or implicitly deduced in the SPS;
3) a PPS: usually syntactic elements directly existing or implicitly deduced in the SPS;
4) a slice header: usually syntactic elements directly existing or implicitly deduced in the strip (slice) header;
5) a CTU header: usually syntactic elements directly existing or implicitly deduced in the CTU header;
6) a CU header: usually syntactic elements directly existing or implicitly deduced in the CU header;
7) a coding and decoding block header: usually syntactic elements directly existing or implicitly deduced in the coding and decoding block header; and
8) positions before one or a group or string of current coding pixel samples in the coding and decoding block: usually syntactic elements directly existing or implicitly deduced before one or a group or string of current coding pixel samples in the coding and decoding block.

Embodiment 7 of the present disclosure provides another generation manner for the predicted values.

The predicted values are determined according to the number of the pixels of the representative pixel set of the coding and decoding block in embodiment 2.

When the number of the pixels is smaller than a threshold value, the numerical values of the representative pixel samples are selected as the predicted values.

Otherwise, the numerical values of the reconstructed pixel samples are selected as the predicted values.

Embodiment 8 of the present disclosure provides another generation manner for the predicted values.

In the method of embodiment 3 or embodiment 4, a coder selects one of the optimal representative pixel samples and the reconstructed pixel samples as the predicted values.

Optionally, the coder sets the flags used for indicating the selected predicted values, and writes the flags into the bitstream by virtue of the at least one of the following methods.

In a first method, the coder writes flags used for indicating predicted values selected for the whole sequence into one or more parameter sets in a VPS, an SPS and a PPS.

In a second method, the coder writes flags used for indicating predicted values selected for the image into at least one of the PPS and slice (also called as strip) header information.

In a third method, the coder writes flags used for indicating predicted values selected for an identification block layer into at least one of an LCU (or CTU) layer and a CU layer.

Correspondingly, a decoder parses the bitstream to obtain values of the flags, and determines whether to select the optimal representative pixel samples or the reconstructed pixel samples as the predicted values in the decoding process according to the values of the flags.

Optionally, the coder does not write the flags used for indicating the selected predicted values into the bitstream. The coder adopts the predicted values meeting a predetermined condition as candidate predicted values used for the coding process as a default. Correspondingly, the decoder adopts the same predetermined condition of the coder, and selects the predicted values meeting the condition as candidate predicted values used for the decoding process.

Optionally, the coder does not write the flags used for indicating the selected predicted values into the bitstream. The coder adopts the predicted values meeting the predetermined condition as the candidate predicted values used for the coding process as a default. And meanwhile, the coder writes a parameter of the predetermined condition into the bitstream, the parameter of the predetermined condition being written into the bitstream by virtue of at least one of the following methods.

In a first method, the coder writes the parameter of the predetermined condition configured to identify the whole sequence into one or more parameter sets in the VPS, the SPS and the PPS.

In a second method, the coder writes the parameter of the predetermined condition configured to identify the image into at least one of the PPS and the slice header.

In a third method, the coder writes the parameter of the predetermined condition parameter configured to identify the identification block layer into at least one of the LCU (CTU) layer and the CU layer. Correspondingly, the decoder parses the bitstream to obtain the parameter of the predetermined condition, and selects the predicted values meeting the predetermined condition as the candidate predicted values used for the decoding process according to the parameter and the predetermined condition.

From the above descriptions about the implementation modes, those skilled in the art clearly learn about that the methods of the embodiments are implemented in a manner of combining software and a necessary universal hardware platform, and of course, are also implemented through hardware, but the former one is a better implementation mode under many conditions. Based on such an understanding, the technical solutions of the present disclosure substantially or parts making contributions to the conventional art are embodied in form of software product. And the computer software product is stored in a storage medium (such as a Read Only Memory (ROM)/Random Access Memory (RAM), a magnetic disk and an optical disk), including a plurality of instructions used for enabling a terminal equipment (which is a mobile phone, a computer, a server, network equipment or the like) to execute the method of each embodiment of the present disclosure.

An embodiment of the present disclosure also provides a storage medium. Optionally, in the embodiment, the storage medium is arranged to store program codes used for executing the following steps.

At S1, a representative pixel set of a coding block is constructed, and information for constructing the representative pixel set is acquired.

At S2, predictive coding or copying coding is performed on the coding block to acquire predicted values of pixel samples of the coding block, a generation manner for the predicted values including: calculating the predicted values according to a predetermined rule according to reconstructed pixel samples in an image region outside the coding block and pixel numerical values of the representative pixel set in combination with a predetermined coding parameter; and At S3, the information for constructing the representative pixel set and information required by acquiring the predicted values are coded and written into a video bitstream.

Optionally, in the embodiment, the storage medium includes, but not limited to: various media capable of storing program codes such as a U disk, a ROM, a RAM, a mobile hard disk, a magnetic disk or an optical disk.

Optionally, in the embodiment, a processor executes the methods and steps of the abovementioned embodiments according to the program codes stored in the storage medium.

Optionally, specific examples in the embodiment refer to examples described in the abovementioned embodiments and optional implementation modes, and will not be elaborated in the embodiment.

Obviously, those skilled in the art should know that each component or each step of the present disclosure is implemented by a universal computing device, and the components or steps are concentrated on a single computing device or distributed on a network formed by multiple computing devices, and are optionally implemented by program codes executable for the computing devices, so that the components or steps are stored in a storage device for execution with the computing devices. The shown or described steps are executed in sequences different from those shown or described here in some circumstances, or form each integrated circuit component respectively, or multiple components or steps therein form a single integrated circuit component for implementation. As a consequence, the present disclosure is not limited to any specific hardware and software combination.

The above are the exemplary embodiments of the present disclosure and not intended to limit the present disclosure. For those skilled in the art, the embodiments of the present disclosure have various modifications and variations. Any modifications, equivalent replacements, improvements and the like made within the scope protection as claimed in the claims of the present disclosure shall fall within the scope of protection of the present disclosure.

INDUSTRIAL APPLICABILITY

Based on the technical solutions provided by embodiments of the present disclosure, the representative pixel set of the coding block is constructed, the information for constructing the representative pixel set is determined, the predicted values of the pixel samples in the coding block are constructed, the generation manner for the predicted values including: constructing the predicted values of the pixel samples according to the reconstructed pixel samples in the image region to outside the coding block and the pixel values of the representative pixel set, and the information for constructing the representative pixel set and the information for constructing the predicted values are coded and written into the video bitstream, so that a problem that a mutual correlation is weaker and compression efficiency is lower if distances between positions of these reconstructed pixels for obtaining predicted values and a current block are longer in the related art is solved, correlation between predicted values from an image region outside a current block and current pixel samples is improved, and compression efficiency is effectively improved.

What is claimed is:

1. A method for image coding, comprising:
Constructing a representative pixel set of a coding block within the coding block, and determining information for constructing the representative pixel set, wherein a representation format of a representative pixel in the representative pixel set is a palette index;
constructing predicted values of pixel samples in the coding block, a generation manner for the predicted values comprising: constructing the predicted values of the pixel samples according to reconstructed pixel samples in an image region outside the coding block and pixel values of the representative pixel set in the coding block; and
coding and writing the information for constructing the representative pixel set and information for constructing the predicted values into a video bitstream;
wherein the generation manner for the predicted values comprises: setting reconstructed pixel samples outside the coding block or variants of the reconstructed pixel samples as the predicted values of part of the pixel samples; and setting the pixel values of the representative pixel set or variants of the pixel values of the representative pixel set as the predicted values of other part of the pixel samples;
wherein, for the pixel samples in the coding block, the generation manner for the predicted values comprises:
for the reconstructed pixel samples outside the coding block, calculating distances between the reconstructed pixel samples and part or all of representative pixel samples of the representative pixel set, and setting the representative pixel samples of which the distances meet a first predefined condition as optimal representative pixel samples; and
under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

2. The method as claimed in claim 1, wherein
the coding block is a coding region of an image, and comprises at least one of: a Largest Coding Unit (LCU), a Coding Tree Unit (CTU), a Coding Unit (CU), a sub-region of the CU, a Prediction Unit (PU), a Transform Unit (TU), a pixel string, a pixel group, a pixel micro-block and a pixel strip; and
the image region outside the coding block comprises at least one of: an image region outside a variant of the coding block and an image region formed by pixels which have been partially coded.

3. The method as claimed in claim 1, wherein the predicted values of the pixel samples in the coding block are constructed by using at least one of the following coding parameters, comprising:
positions of the reconstructed pixel samples in an image;

the information for constructing the representative pixel set;
a number of pixels of the representative pixel set;
positions of current coding pixel samples in the coding block;
types of pixel components of the coding block, wherein one pixel component or two pixel components of the pixel components select the pixel values of the representative pixel set as predicted values, and the other pixel components, except the one pixel component or the two pixel components, of the pixel components select pixel values of the reconstructed pixel samples as predicted values; and
flags for the predicted values.

4. The method as claimed in claim 3, wherein
positions of the reconstructed pixel samples outside the coding block in an image are divided into at least one of rows and/or columns adjacent to the coding block; when the reconstructed pixel samples are positioned inside at least one of the rows and/or columns adjacent to the coding block, numerical values of the representative pixel samples of the representative pixel set are set as the predicted values; and when the reconstructed pixel samples are positioned outside at least one of the rows and/or columns adjacent to the coding block, numerical values of the reconstructed pixel samples are set as the predicted values;
or flags for the predicted values are directly obtained from the video bitstream or obtained by deduction according to at least one existing parameter in the video bitstream; the flags for the predicted values are used for indicating one of numerical values of the representative pixel samples of the representative pixel set and numerical values of the reconstructed pixel samples outside the coding block to be selected as the current coding pixel samples in a coding process; and positions of the flags in the video bitstream comprise one of: a VPS, an SPS, a PPS, a slice header, a CTU header, a CU header, a coding block header and positions before one or a group or string of current coding pixel samples in the coding block;
or determining the predicted values according to the number of pixels in the representative pixel set comprises: when the number of the pixels is smaller than a second predetermined threshold value, setting numerical values of the representative pixel samples of the representative pixel set as the predicted values; and when the number of the pixels is not smaller than the second predetermined threshold value, setting the numerical values of the reconstructed pixel samples as the predicted values.

5. The method as claimed in claim 1, wherein
the distances are errors between pixels, the first predefined condition is that the errors are minimum, and the second predefined condition is that the errors are smaller than a first predetermined threshold value.

6. The method as claimed in claim 1, wherein setting the optimal representative pixel samples or the reconstructed pixel samples as the predicted values further comprises at least one of:
writing the flags indicating the predicted values into the video bitstream;
writing at least one condition parameter for constructing the predicted values into the video bitstream, wherein the pixel samples meeting the at least one condition parameter are determined as the predicted values.

7. The method as claimed in claim 6, wherein writing the flags indicating the predicted values into the video bitstream comprises at least one of: writing flags used for indicating predicted values selected for a whole sequence into at least one of the following parameter sets: a Video Parameter Set (VPS), a Sequence Parameter Set (SPS) and a Picture Parameter Set (PPS); writing flags used for indicating predicted values selected for an image into at least one of a PPS and slice header; and writing flags used for indicating predicted values selected for a block layer into at least one of an LCU and a CU;
or writing the at least one condition parameter for construction of the predicted values into the video bitstream comprises at least one of: writing the at least one condition parameter selected for a whole sequence into at least one of the following parameter sets: a VPS, an SPS and a PPS; writing the at least one condition parameter selected for an image into at least one of the PPS and slice header; and writing the at least one condition parameter selected for a block layer into at least one of an LCU layer and a CU layer.

8. A method for image decoding, comprising:
parsing a bitstream to acquire at least one decoding parameter of a decoding block, wherein the at least one decoding parameter comprises at least one of the following parameters: at least one parameter for constructing a representative pixel set of the decoding block, and at least one parameter for constructing predicted values of pixel samples in the decoding block, a representation format of a representative pixel in the representative pixel set is a palette index; and
constructing the representative pixel set, and determining predicted values, wherein a generation manner for the predicted values comprises: constructing the predicted values according to reconstructed pixel samples and pixel values of the representative pixel set;
wherein the generation manner for the predicted values comprises: setting reconstructed pixel samples outside the coding block or variants of the reconstructed pixel samples as the predicted values of part of the pixel samples; and setting the pixel values of the representative pixel set in the coding block or variants of the pixel values of the representative pixel set as the predicted values of other part of the pixel samples;
wherein, for the pixel samples in the decoding block, the generation manner for the predicted values comprises:
for the reconstructed pixel samples outside the decoding block, calculating distances between the reconstructed pixel samples and part or all of representative pixel samples of the representative pixel set, and setting the representative pixel samples of which the distances meet a first predefined condition as optimal representative pixel samples; and
under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

9. The method as claimed in claim 8, wherein
the decoding block is a decoding region in an image, and comprises at least one of: a Largest Coding Unit (LCU), a Coding Tree Unit (CTU), a Coding Unit (CU), a sub-region of the CU, a Prediction Unit (PU), a Transform Unit (TU), a pixel string, a pixel group, a pixel micro-block and a pixel strip; and an image region outside the decoding block comprises at least one of: an image region outside a variant of the decoding block and an image region formed by pixels which have been partially decoded.

10. The method as claimed in claim 8, wherein the predicted values of the pixel samples in the decoding block are constructed by using at least one of the following coding parameters, comprising:

positions of the reconstructed pixel samples in an image;
the parameters for constructing the representative pixel set;
a number of pixels of the representative pixel set;
positions of current decoding pixel samples in the decoding block;
types of pixel components of the decoding block, wherein one pixel component or two pixel components of the pixel components select the pixel values of the representative pixel set as predicted values, and the other pixel components, except the one pixel component or the two pixel components, of the pixel components select pixel numerical values of the reconstructed pixel samples as predicted values; and
flags for the predicted values.

11. The method as claimed in claim 10, wherein dividing the positions of the reconstructed pixel samples outside the decoding block in the image into at least one of rows and/or columns adjacent to the decoding block; when the reconstructed pixel samples are positioned in at least one of rows and/or columns adjacent to the decoding block, setting numerical values of the representative pixel samples of the representative pixel set as the predicted values; and when the reconstructed pixel samples are positioned outside at least one of rows and/or columns adjacent to the coding block, setting numerical values of the reconstructed pixel samples as the predicted values;

or parsing at least one of the following data units in the bitstream to obtain the flags for the predicted values, the data units comprising at least one of: a VPS, an SPS, a PPS, a slice header, a CTU header, a CU header, a coding block header and data units before one or a group or string of current coding pixel samples in a coding block, wherein the flags for the predicted values are directly obtained from the bitstream or obtained by deduction according to at least one existing parameter in the video bitstream, and the flags for the predicted values are used for indicating whether numerical values of the representative pixel samples of the representative pixel set or numerical values of the reconstructed pixel samples outside the decoding block are set as the predicted values;

or determining the predicted values according to the number of pixels in the representative pixel set comprises: when the number of the pixels is smaller than a second predetermined threshold value, setting numerical values of the representative pixel samples of the representative pixel set as the predicted values; and when the number of the pixels is not smaller than the second predetermined threshold value, setting the numerical values of the reconstructed pixel samples as the predicted values.

12. The method as claimed in claim 8, wherein the distances are errors between pixels, the first predefined condition is that the errors are minimum, and the second predefined condition is that the errors are smaller than a first predetermined threshold value.

13. The method as claimed in claim 8, wherein setting the optimal representative pixel samples or the reconstructed pixel samples as the predicted values comprises at least one of:

parsing the flags in the bitstream, and setting values indicated by the flags as the predicted values; and,
parsing at least one condition parameter in the bitstream, and setting pixel samples meeting the at least one condition parameter as the predicted values.

14. The method as claimed in claim 13, wherein parsing the flags in the bitstream comprises at least one of: parsing a parameter set, comprising at least one of a Video Parameter Set (VPS), a Sequence Parameter Set (SPS) and a Picture Parameter Set (PPS), where flags used for indicating predicted values selected for a whole sequence are located; parsing at least one of a PPS and slice header where flags used for indicating predicted values selected for an image are located; and parsing at least one of an LCU layer and a CU layer where flags used for indicating predicted values selected for a block layer are located;

or parsing the at least one condition parameter in the bitstream comprises at least one of: parsing a parameter set where the at least one condition parameter selected for a sequence is located, wherein the parameter set comprises at least one of: a VPS, an SPS and a PPS; parsing at least one of the PPS and slice header where the at least one condition parameter selected for an image is located; and parsing at least one of an LCU layer and a CU layer where the at least one condition parameter selected for a block layer is located.

15. A device for image coding, comprising:
a first determination component, arranged to construct a representative pixel set of a coding block within the coding block and determine information for constructing the representative pixel set, wherein a representation format of a representative pixel in the representative pixel set is a palette index;
a second determination component, arranged to construct predicted values of pixel samples of the coding block, a generation manner for the predicted values comprising: constructing the predicted values of the pixel samples according to reconstructed pixel samples in an image region outside the coding block and pixel values of the representative pixel set in the block; and
a coding component, arranged to code and write the information for constructing the representative pixel set and information for constructing the predicted values into a bitstream;
wherein the generation manner for the predicted values comprises: setting reconstructed pixel samples outside the coding block or variants of the reconstructed pixel samples as the predicted values of part of the pixel samples; and setting the pixel values of the representative pixel set in the coding block or variants of the pixel values of the representative pixel set as the predicted values of other part of the pixel samples;
wherein, for the pixel samples in the coding block, the generation manner for the predicted values comprises:
for the reconstructed pixel samples outside the coding block, calculating distances between the reconstructed pixel samples and part or all of representative pixel samples of the representative pixel set, and setting the representative pixel samples of which the distances meet a first predefined condition as optimal representative pixel samples; and under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

16. A device for image decoding, comprising:

a parsing component, arranged to parse a bitstream to acquire at least one decoding parameter of a decoding block, wherein the at least one decoding parameter comprises at least one of the following parameters: at least one parameter for constructing a representative pixel set of the decoding block, and at least one parameter for constructing predicted values of pixel samples in the decoding block, a representation format of a representative pixel in the representative pixel set is a palette index; and a third determination component, arranged to construct the representative pixel set, and determine predicted values, wherein a generation manner for the predicted values comprises: constructing the predicted values according to reconstructed pixel samples and pixel values of the representative pixel set;

wherein the generation manner for the predicted values comprises: setting reconstructed pixel samples outside the coding block or variants of the reconstructed pixel samples as the predicted values of part of the pixel samples; and setting the pixel values of the representative pixel set in the coding block or variants of the pixel values of the representative pixel set as the predicted values of other part of the pixel samples;

wherein, for the pixel samples in the decoding block, the generation manner for the predicted values comprises:

for the reconstructed pixel samples outside the decoding block, calculating distances between the reconstructed pixel samples and part or all of representative pixel samples of the representative pixel set, and setting the representative pixel samples of which the distances meet a first predefined condition as optimal representative pixel samples; and under the condition that distances between the optimal representative pixel samples and the reconstructed pixel samples meet a second predefined condition, setting numerical values of the optimal representative pixel samples as the predicted values, and when the distances between the optimal representative pixel samples and the reconstructed pixel samples do not meet the second predefined condition, setting the numerical values of the reconstructed pixel samples as the predicted values.

* * * * *